July 25, 1950 A. SEAFIELD 2,516,595
TOOLHOLDER
Filed Oct. 16, 1948
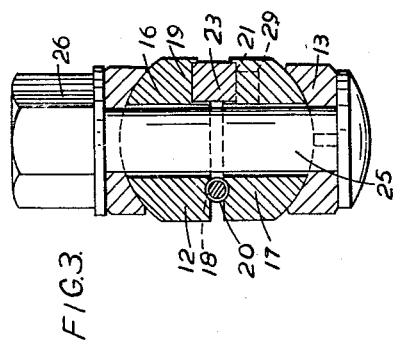
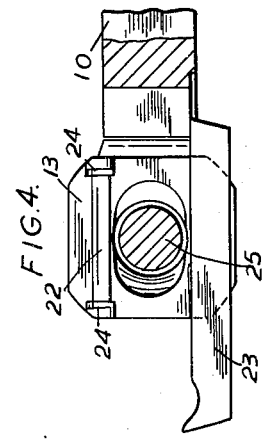
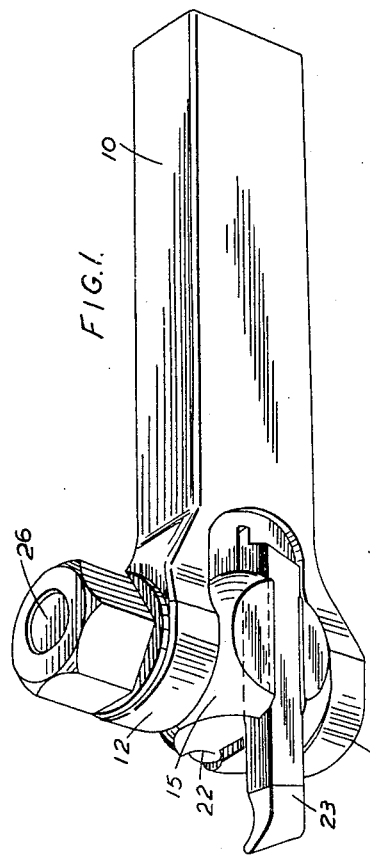
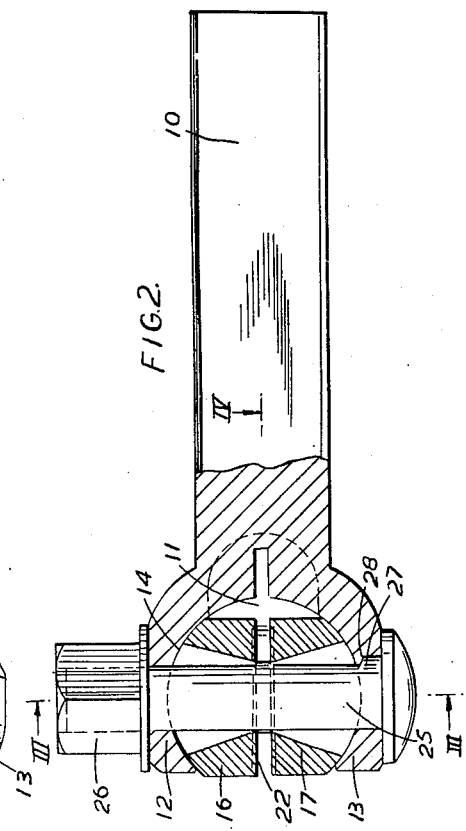
Inventor
Andrew Seafield
By
Attorney

Patented July 25, 1950

2,516,595

UNITED STATES PATENT OFFICE 2,516,595

TOOLHOLDER

Andrew Seafield, Liverpool, England

Application October 16, 1948, Serial No. 55,000
In Great Britain October 28, 1947

5 Claims. (Cl. 29—98)

This invention is for improvements in or relating to tool holders for use in connection with lathe and like machine tools.

One object of the present invention is to provide a tool holder which has facilities for adjustment or setting of the cutting tool both laterally and in a vertical plane, the amount of adjustment or movement available to the cutting tool relatively to the holder being, in some cases, almost what may be called universal.

According to the present invention there is provided a tool holder comprising co-operating ball-and-socket parts, one of which parts has means for clamping or otherwise securing a tool to it, whereby said tool can be adjusted relatively to the other part.

In a preferred embodiment of the invention the holder comprises a shank or main part adapted to be secured to the tool post, or the like, of a lathe and having a spherical socket or spherical seating for a ball-like device at its forward end. The ball device is in two parts adapted to have the cutting tool clamped between them. Conveniently, a single bolt or the like serves to clamp the cutting tool in the ball-like device and at the same time fix the ball device and cutting tool in their position of adjustment with respect to the main part of the holder.

One embodiment of the invention as applied to a tool holder for the cutting tool of a lathe will now be described, by way of example, with reference to the accompanying drawing. On the drawing:

Figure 1 is a perspective view of the tool holder with a lathe cutting tool mounted therein, Figure 2 is a longitudinal elevation of the tool holder, partly in section, Figure 3 is a cross-section on the line XII—XII of Figure 2, and Figure 4 is a cross-section on the line IV—IV of Figure 2.

The holder comprises a main or body part in the form of a bar or shank 10 adapted to be clamped or otherwise secured in or to the tool post or like of the lathe. The forward end of the shank part is bifurcated or forked at 11 and the inner opposed faces of the two limbs 12 and 13 are both formed with a part-spherical recess or seating 14. A tool clamp proper in the form of a ball-like device 15 is located between the two limbs 13 and 14, this ball-like device fitting ball-and-socket fashion in the above mentioned spherical recesses 14. The ball device is divided diametrically into two halves 16 and 17 and the opposed faces of the two halves have recesses 18 and 19 and 20 and 21 respectively which mate to form a socket for a species of hinge-pin 22 and a clamping housing or jaw for the cutting tool 23. The hinge-pin 22, which is located to one side of the ball device 15, has head parts or enlargements 24 on its ends which secure it in position axially. The housing or jaw 19, 21, for the cutting tool 23 is on the opposite side of the ball device to the pin 22. The diameter of the hinge-pin 22 and the cross-section of the cutting tool is such that there is a clearance 24 between the opposed faces of the two hemispherical parts of the ball device. A bolt 25, having a nut 26, passes vertically through the two limbs 12 and 13 of the shank part and also through the centre of the ball device 15.

In using the holder, the cutting tool 23 is inserted in its housing 19, 21 in the ball device 15 and the ball device is adjusted to set the tool at the required and most advantageous angle for operating on the work-piece, the ball-and-socket mounting of the tool providing for almost universal adjustment. When the required setting of the ball device and tool has been effected, the bolt 25 is tightened up by the nut 26 and this not only serves to clamp the tool 23 firmly between the two parts 16, 17 of the ball but also serves firmly to clamp the ball, as a whole, between the bifurcated limbs 12 and 13 of the shank or body part. The said limbs have sufficient resiliency to permit this to be done. Any necessary adjustment may be made as the work proceeds simply by slackening the bolt, making the adjustment and then re-tightening the bolt. The tool can be changed from right-hand working to left-hand working, and vice versa, simply by turning the ball device through 180° about the axis of the bolt, the cutting tool being reversed if necessary, i. e. if it is not provided with a cutting edge at both ends. A further advantage of the holder, according to the present invention, is that the cutting tool can be adjusted, by angular upward or downward movement, for height of work-piece with a minimum forward projection or overhang of the cutting tool, thus maintaining the rigidity of the tool. A small "keep" or key and key-way 27, 28, on the bolt 25 and one limb of the shank part of the holder serve to prevent rotation of the bolt.

The cutting tool and its housing may be of square, round or any other cross-section.

For some purposes it may be advantageous to off-set the forked end 11 above the shank part 10.

The ball device 15 may have a slightly different curvature to the seatings 14 in the limbs 12 and 13. For example, the seatings 14 may be truly spherical whilst the ball device 15 is very slightly ovoid or out of centre. This is found to increase the grip of the limbs or jaws 12, 13 and helps to ensure that there will be no movement of the ball part after tightening of the bolt 25.

One or both of the limbs 12, 13 of the shank part may be hinged to the latter so as to swing into and out of engagement with the ball device. This is an alternative to providing for some spring in the jaws or limbs 12, 13, as shown on the drawing.

It will be understood that a second tool proper may take the place of the pin 22 in which case both sides of the ball device 15 may be provided with recesses similar to the recesses 19, 21. These recesses may be varied in shape according to the tools they are to receive but a rectangular recess with a smaller groove in its upper or lower face will be found to accommodate either a rectangular or round tool. Such a groove is indicated in chain lines at 29 in Figure 3.

It will be appreciated that the spherical sockets may be in the clamp proper and the main or shank part may have hemispherical or like ball parts which fit in said sockets to provide for ball-and-socket adjustment of the tool clamp.

I claim:

1. A tool holder for use in a lathe, comprising a shank part for securing the holder to the tool post of the lathe, and having a jaw, said jaw having spherical recesses in its opposed faces, a ball-like device located between said jaws and seated in said spherical recesses, said ball-like device comprising two separable halves, at least one of which has a recess to accommodate a tool between the two halves, and a clamping bolt passing diametrically through the ball-like device and the jaw to clamp the ball in the jaw and the tool in the ball-like device.

2. A tool holder for use in a lathe, comprising a shank part for securing the holder to the tool post of the lathe and having a jaw, said jaw having spherical recesses in its opposed faces, a ball-like device located between said jaws and seated in said spherical recesses, said ball-like device comprising two separable halves, at least one of which has a recess to accommodate a tool between the two halves, a clamping bolt passing diametrically through the ball-like device and the jaw to clamp the ball in the jaw and the tool in the ball-like device and a hinge-pin located between the two halves about which they move to clamp and release the tool.

3. A tool holder for use in a lathe, comprising a shank part for securing the holder to the tool post of the lathe and having a jaw, said jaw having spherical recesses in its opposed faces, a ball-like device located between said jaws and seated in said spherical recesses, said ball-like device comprising two separable halves, at least one of which has a recess to accommodate a tool between the two halves, and a clamping bolt passing diametrically through the ball-like device and the jaw to clamp the ball in the jaw and the tool in the ball-like device, the ball-like device having a curvature slightly different to that of the socket.

4. A tool holder for use in a lathe, comprising a shank part for securing the holder to the tool post of the lathe and having a jaw, at least one member of which has a hinged connection to the shank, said jaw having spherical recesses in its opposed faces, a ball-like device located between said jaws and seated in said spherical recesses, said ball-like device comprising two separable halves, at least one of which has a recess to accommodate a tool between the two halves, and a clamping bolt passing diametrically through the ball-like device and the jaw to clamp the ball in the jaw and the tool in the ball-like device.

5. A tool holder for use in a lathe, comprising a shank part for securing the holder to the tool post of the lathe and having a jaw, said jaw having concave recesses in its opposed faces, a ball-like device of slightly ovoid form located between said jaws and seated in said concave recesses, said ball-like device comprising two separable halves, at least one of which has a recess to accommodate a tool between the two halves, and a clamping bolt passing diametrically through the ball-like device and the jaw to clamp the ball in the jaw and the tool in the ball-like device.

ANDREW SEAFIELD.

REFERENCES CITED

The following references are of record in the file of this patent:

UNITED STATES PATENTS

| Number | Name | Date |
|---|---|---|
| 641,241 | Sherwood | Jan. 9, 1900 |
| 966,755 | Kuhn | Aug. 9, 1910 |
| 1,200,416 | Draper | Oct. 3, 1916 |

FOREIGN PATENTS

| Number | Country | Date |
|---|---|---|
| 105,289 | Switzerland | Aug. 1, 1924 |